Aug. 20, 1929.　　　T. W. HICKS　　　1,725,190
APPARATUS FOR PREPARING THE SOIL FOR STIMULATED CROP GROWTH
Filed Nov. 5, 1921　　　2 Sheets-Sheet 1
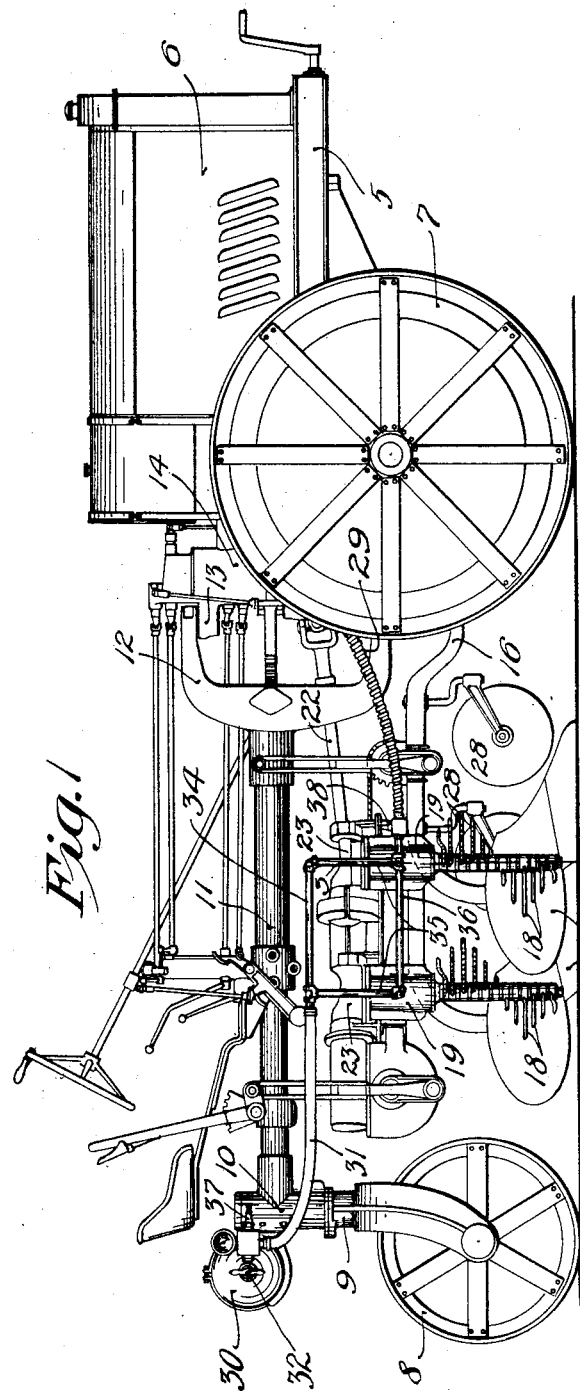
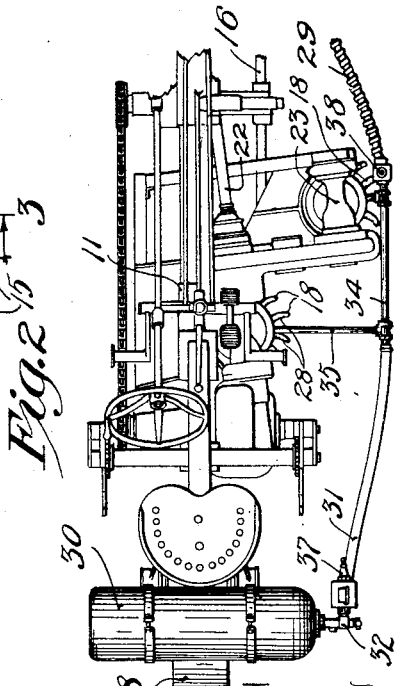
Inventor
Thomas W. Hicks
By his Attorneys
Merchant & Kilgore

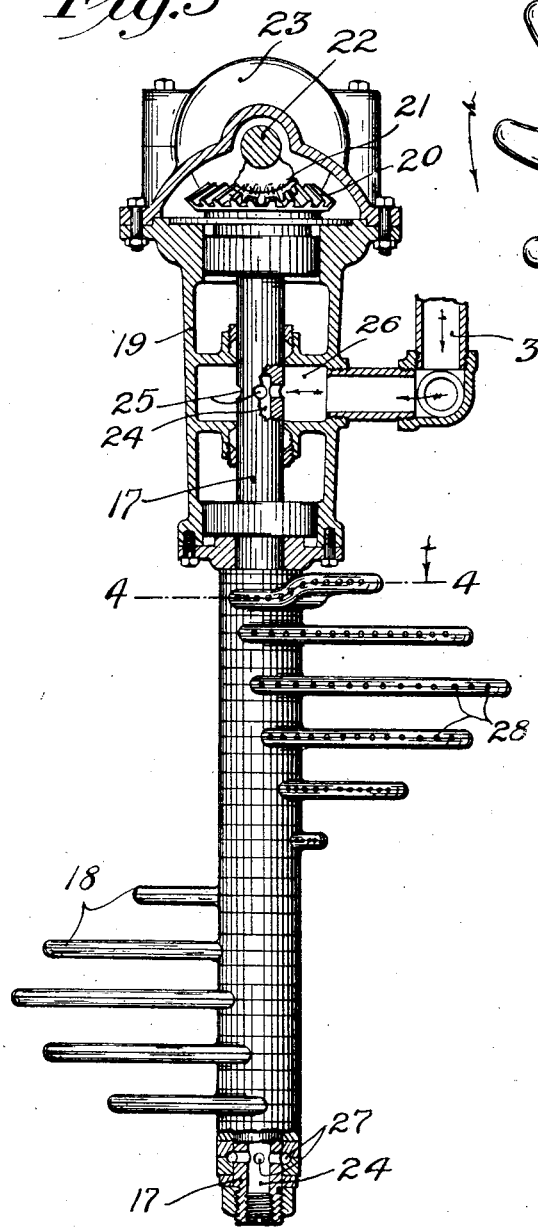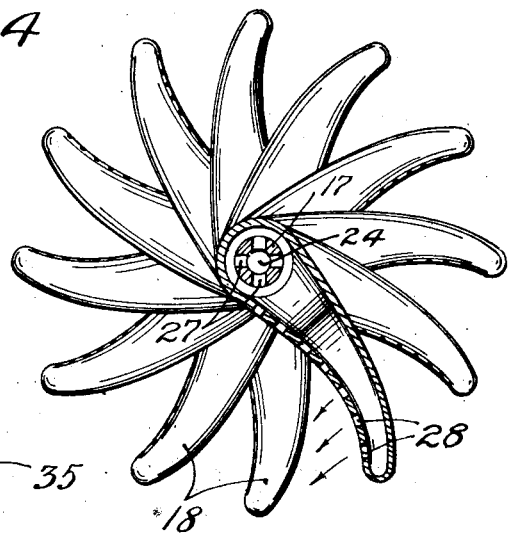

Patented Aug. 20, 1929.

1,725,190

UNITED STATES PATENT OFFICE.

THOMAS W. HICKS, OF MINNEAPOLIS, MINNESOTA, ASSIGNOR TO SCIENTIFIC FARMING MACHINERY COMPANY, OF MINNEAPOLIS, MINNESOTA, A COMMON-LAW COMPANY.

APPARATUS FOR PREPARING THE SOIL FOR STIMULATED CROP GROWTH.

Application filed November 5, 1921. Serial No. 513,062.

My present invention is particularly directed to a method for the treatment of the soil or earth for the purpose of stimulating plant growth by the introduction of carbon dioxide gas ($CO_2$), or other fluid.

My object is to provide an apparatus of simple, durable and inexpensive construction, designed to cut and partly turn over a furrow slice, and then when the furrow slice is in a partly turned-over condition, apply to it a series of blows from rapidly moving blades for the purpose of thoroughly pulverizing the furrow slice, and throwing the pulverized particles thereof through the air toward the ground, and at the time when these pulverizer blades are engaging the furrow slice and pulverizing it and throwing it to the ground, to inject into the pulverized soil a quantity of carbon dioxide, or other fluid, for soil treatment purposes. Obviously, if this fluid injection is made at the time when the soil is being pulverized, and being thrown toward the ground, the particles are relatively widely separated and the fluid is thereby caused to thoroughly penetrate and surround each particle of soil.

My invention consists in the construction, arrangement and combination of the various parts of the device, whereby the objects contemplated are attained, as hereinafter more fully set forth, pointed out in my claims, and illustrated in the accompanying drawings, in which:

Fig. 1 is a side elevation of the complete tiller designed as a motor-propelled and operated tractor;

Fig. 2 is a plan view showing approximately the rear half portion of the tiller;

Fig. 3 is a detail on an enlarged scale, partly in plan and partly in vertical section on the line 3—3 of Fig. 1; and Fig. 4 is a horizontal section on the line 4—4 of Fig. 3.

For the purposes of this case, the parts of the tiller may be briefly indicated as follows:

The numeral 5 indicates the front frame which carries the engine or motor 6 and is supported by motor-driven traction wheels 7. The numeral 8 indicates a rear caster wheel journaled to a caster wheel bracket 9 pivoted to a bearing 10 on the rear end of a long reach bar 11 having at its front end an upright yoke 12 connected by vertical pivots 13 to a bracket 14 secured on the rear portion of the frame 5. The means for steering the tractor and for controlling certain other functions thereof need not be here considered.

The tiller shown is equipped with two plows 15, the beams of which are secured to a draw-bar 16 suitably connected to the plow frame 15 with freedom for vertical movements.

Co-operating with each plow is a rotary pulverizer, which, as shown, comprises an upright shaft 17 provided with substantially radial blades 18 preferably in spiral arrangement. These blades 18 are made hollow and their hollow hubs surround and are secured to the shaft 17.

The upper portions of the shafts 17 are journaled in hollow bearings 19 that are rigidly secured on the plow draw-bar 16. At their extreme upper ends, said shafts 17 are provided with bevel gears 20 that mesh with bevel gears 21 carried by a jointed engine-driven driving shaft 22, the rear section of which is journaled in a housing 23 also secured on the plow draw-bar 16. Thus, the rotary pulverizer will be driven from the engine 6.

The shafts 17 are provided with longitudinal gas conduits 24 closed at their upper and lower ends but provided at their upper portions with radial ports 25 that will always be in communication with co-operating gas chambers 26 formed in the respective bearings 19, (see Fig. 3). At various different points, the shaft 17 is provided with radial discharge ports 27, (see Figs. 3 and 4), that open into the hollow hubs of the respective pulverizing blades 18.

The pulverizing blades 18 are preferably slightly backwardly curved in respect to the direction of rotation of the pulverizers and, at their rear edges, said blades are provided with rows of closely spaced gas-discharge ports or passages 28.

The engine 6 is an internal combustion engine preferably of the multi-cylinder type and the exhaust from this engine is utilized as a source of supply of carbon dioxide gas and, in the drawings, the numeral 29 indicates a flexible extension of the exhaust pipe from such engine. Preferably, however, an additional supply of carbon dioxide gas is carried in a high pressure tank 30 shown as secured to the rear bearing 10 and connected to a flexible gas delivery tube 31 through a suitable reduction valve 32. The gas tube 31 is connected to a gas pipe 34 with branches 35 that are connected one to each of the gas chambers 26 of the two hollow bearings 19. The exhaust pipe 29 is connected to a gas pipe 36 that is also connected to said two gas chambers 26. For converting the carbon monoxide gas as it is being delivered to the soil disintegrators, I have indicated two continuous acting spark plugs 37 and 38 located respectively in the connection between the reduction valve 32 and tube 31 and in the connection between the exhaust pipe 29 and pipe 36.

It is obvious, when the pulverizers are rotated against the furrow slices turned up by the plow shares, they will pulverize the furrow slice into a finely divided state. While this is taking place, if the carbon dioxide gas be turned on from the tank 30 and the exhaust connected as described, the carbon dioxide gas, under pressure from both sources, will be forced and discharged through the air ports 28 located at the rear of the pulverizing blades, thus impregnating the soil mass to the full depth to which the soil has been plowed. Thus, the carbon dioxide gas becomes very thoroughly and intimately commingled with the earth particles. The gas-impregnated soil mass will settle under the action of gravity, caging and sealing the carbon dioxide gas within the pore spaces of the loosely returned soil mass, making possible all the advantageous results fully discussed in the earlier part of this specification.

From what has been stated, it will be understood that this invention involves not only a method or process of treating the soil but also a machine or apparatus especially adapted for carrying out the process, and which machine or apparatus, per se, contains important patentable novelty.

What I claim is:

1. In an agricultural implement, a plow for cutting and lifting a furrow slice of soil, a rotatable shaft mounted adjacent the plow and provided with blades arranged to engage the soil being lifted by the plow, said rotatable shaft and said blades being hollow and said blades being provided with nozzle openings, and means for forcing a fluid through the shaft and blades into the soil being pulverized.

2. In an agricultural implement, a plow for cutting and lifting a furrow slice, a vertically disposed rotatable shaft mounted at its upper end to occupy a suspended position adjacent the plow, said shaft being provided with blades arranged to engage and pulverize the soil being lifted by the plow, said rotatable shaft and said blades being hollow, said blades being provided with nozzle openings in their rearward edges, and a fluid supply conduit communicating with the interior of said hollow rotatable shaft adjacent its point of support.

3. In an agricultural implement, a plow having a moldboard and designed to cut and partially complete the turning-over movement of a furrow slice, an upright shaft, means for rapidly rotating the shaft, pulverizer blades carried by the shaft and positioned to engage the under surface of the furrow slice while the furrow slice is in substantially upright position, and to complete the turning-over movement of the furrow slice and at the same time pulverize the soil and throw it laterally from the moldboard of the plow and to widely separate the particles thereof while being thrown through the air, and a means for injecting a fluid into the furrow slice at the point where the pulverizer blades engage the furrow slice and during the time that the particles of the soil are in widely separated condition in the air.

In testimony whereof I affix my signature.

THOMAS W. HICKS.